(12) United States Patent
Pagan et al.

(10) Patent No.: US 7,657,682 B2
(45) Date of Patent: Feb. 2, 2010

(54) BUS INTERCONNECT WITH FLOW CONTROL

(75) Inventors: Annette Pagan, Austin, TX (US); Matthew D. Akers, Austin, TX (US); Christine E. Moran, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 123 days.

(21) Appl. No.: 11/855,706

(22) Filed: Sep. 14, 2007

(65) Prior Publication Data

US 2009/0077289 A1    Mar. 19, 2009

(51) Int. Cl.
    *G06F 12/00*    (2006.01)
(52) U.S. Cl. .................. 710/244; 370/230; 370/412; 711/151
(58) Field of Classification Search .................. 370/230, 370/235, 412; 710/110, 319, 316–317, 244; 711/151
See application file for complete search history.

(56) References Cited

U.S. PATENT DOCUMENTS

| | | | |
|---|---|---|---|
| 5,694,556 A | 12/1997 | Neal et al. | |
| 6,202,112 B1 | 3/2001 | Gadagkar et al. | |
| 6,249,520 B1 | 6/2001 | Steely, Jr. et al. | |
| 6,252,849 B1 | 6/2001 | Rom et al. | |
| 6,425,023 B1 | 7/2002 | Batchelor et al. | |
| 6,460,108 B1 * | 10/2002 | McCoskey et al. | 710/310 |
| 6,584,529 B1 | 6/2003 | Thomas | |
| RE38,428 E | 2/2004 | Kelly et al. | |
| 6,820,165 B2 | 11/2004 | Pannell | |
| 7,139,860 B2 | 11/2006 | Walker et al. | |
| 7,219,178 B2 | 5/2007 | Harris et al. | |
| 7,227,841 B2 * | 6/2007 | Mullendore et al. | 370/230 |
| 7,363,406 B2 * | 4/2008 | Chai et al. | 710/244 |
| 2002/0083256 A1 | 6/2002 | Pannell | |
| 2005/0163138 A1 * | 7/2005 | Kanazawa | 370/412 |
| 2006/0271715 A1 * | 11/2006 | Harris et al. | 710/110 |

* cited by examiner

*Primary Examiner*—Clifford H Knoll
(74) *Attorney, Agent, or Firm*—Ranjeev Singh; David G. Dolezal (57) ABSTRACT

A method of operating a bus interconnect coupled to bus masters and bus slaves is provided. The method includes receiving a request from a bus master to perform a bus transaction associated with a transaction ID with a bus slave of the plurality of bus slaves, the bus transaction being a first type of bus transaction. The method further includes performing the transaction if a resource allocation parameter allocated to the bus master meets a first threshold. The method further includes if the resource allocation parameter does not meet the first threshold, performing the data transaction only if the transaction meets a condition of a set of at least one condition, wherein a condition of the set of at least one condition includes that the transaction ID of the transaction is not a transaction ID of any outstanding bus transaction of the first type requested by the bus master.

20 Claims, 5 Drawing Sheets

BUS INTERCONNECT WITH FLOW CONTROL

BACKGROUND

1. Field

This disclosure relates generally to data processing systems, and more specifically, to a bus interconnect with flow control.

2. Related Art

Traditional bus interconnects that handle split transactions require that read data transactions with the same transaction ID must be returned in the same order that the master issued the addresses. Moreover, a slave is allowed to service read data transactions out of order if the transaction IDs are not the same. If read data transactions with the same transaction ID are coming from different slaves, the bus interconnect has to ensure that the transactions are returned to each master in the particular order that the master issued the addresses. For example, if a master performs the following transactions: 1. read to slave A with transaction ID=0; 2. read to slave B with transaction ID=1; 3. read to slave A with transaction ID=1; and 4. read to slave B with transaction ID=0. In this example, if slave A decides to send the data for transaction ID 1 before sending the data for transaction ID 0 and slave B decides to send the data for transaction ID 0 before sending the data for transaction ID 1, then a deadlock will occur. This is because the bus interconnect cannot forward either of these transactions until it forwards transaction ID 0 from slave A first and transaction ID 1 from slave B first.

To avoid such deadlock situations, traditional bus interconnects handle multiple in-order transactions by blocking transactions to slaves until the previous transaction with the same transaction ID is completely finished. Although this simple rule solves the deadlock problem, it can result in performance degradation.

Accordingly, there is a need for a bus interconnect with flow control that can avoid deadlock without degrading the performance of the bus interconnect.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a method of operating a bus interconnect coupled to a plurality of bus masters and a plurality of bus slaves is provided. The method includes receiving a request from a bus master of the plurality of bus masters to perform a bus transaction associated with a transaction ID with a bus slave of the plurality of bus slaves, the bus transaction being a first type of bus transaction. The method further includes performing the transaction if a resource allocation parameter allocated to the bus master meets a first threshold. The method further includes if the resource allocation parameter does not meet the first threshold, performing the data transaction only if the transaction meets a condition of a set of at least one condition, wherein a condition of the set of at least one condition includes that the transaction ID of the transaction is not a transaction ID of any outstanding bus transaction of the first type requested by the bus master.

In another aspect, bus interconnect is provided. The bus interconnect includes a first plurality of ports, each port of the first plurality for coupling to a bus master. The bus interconnect further includes a second plurality of ports, each port of the second plurality of ports for coupling to a bus slave. The bus interconnect further includes arbitration circuitry for directing requests from a bus master coupled to a port of the first plurality of ports to a bus slave coupled to a port of the second plurality of ports. The bus interconnect further includes buffer circuitry for buffering information from a bus slave coupled to a port of the second plurality to a bus master coupled to a port of the first plurality of ports. The bus interconnect further includes flow control circuitry. The flow control circuitry includes resource allocation circuitry for determining for each bus master coupled to an input port of the first plurality of ports, whether a resource allocation parameter for the bus master meets a threshold for the bus master. The flow control circuitry further includes request gating circuitry, the request gating circuitry blocking a request from a bus master coupled to a port of the first plurality of ports if a resource allocation parameter for the bus master does not meet a threshold as determined by the resource allocation circuitry, wherein if the resource allocation parameter is determined not to meet a threshold as determined by the resource allocation circuitry, the request gating circuitry allowing the request only if a transaction of the request meets a condition of a set of at least one condition, wherein one condition of the set of at least one condition includes whether a transaction ID of the request by the bus master is not a transaction ID of any outstanding bus transactions requested by the bus master of a same type of transaction requested by the request.

In yet another aspect, a method of operating a bus interconnect coupled to a plurality of bus masters and a plurality of bus slaves is provided. The method includes receiving a request from a bus master of the plurality of bus masters to perform a bus transaction associated with a transaction ID with a bus slave of the plurality of bus slaves, the bus transaction being a first type of bus transaction. The method further includes determining if a resource allocation parameter allocated to the bus master meets a first threshold. The method further includes performing the transaction if the resource allocation parameter allocated to the bus master meets a first threshold. The method further includes if the resource allocation parameter is determined not meet the first threshold, performing the bus transaction only if: 1) the transaction ID of the transaction is not a transaction ID of any outstanding bus transaction of the first type requested by the first bus master; or 2) the transaction ID of the bus transaction is a transaction ID of an outstanding bus transaction requested by the first bus master and the bus transaction's effect on resource usage would allow the resource allocation parameter to meet a second threshold.

Figure 1:
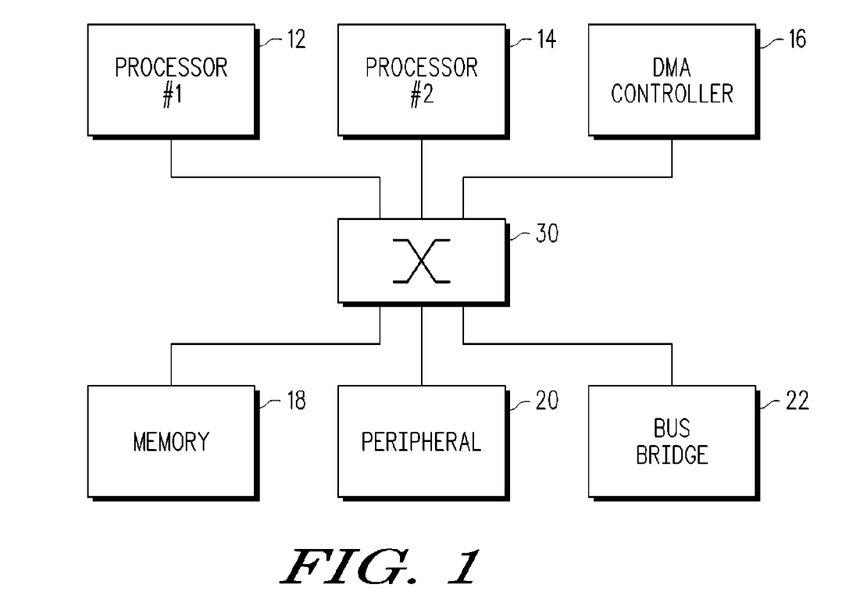
FIG. 1 shows an exemplary data processing system including a bus interconnect.

FIG. 1 shows an exemplary data processing system 10 including a bus interconnect 30. By way of example, data processing system 10 may include processor #1 12, processor #2 14, DMA controller 16, memory 18, peripheral 20, and bus bridge 22, which may be interconnected via bus interconnect 30. Processor #1 12, processor #2 14, and DMA controller 16 may act as a master of bus interconnect 30. Memory 18, peripheral 20, and bus bridge 22 may act as a slave of bus interconnect 30. Processor #1 may be an ARM core. Processor #2 may be a digital signal processing core. Bus interconnect 30 may be a cross-bar switch type of bus interconnect. For example, bus interconnect 30 may be an AXI interconnect module. Data processing system 10 may be a system on chip. Although FIG. 1 shows specific number and type of components arranged in a specific manner, exemplary data processing system 10 may include additional or fewer and other type of components, which may be arranged differently.

Figure 2:
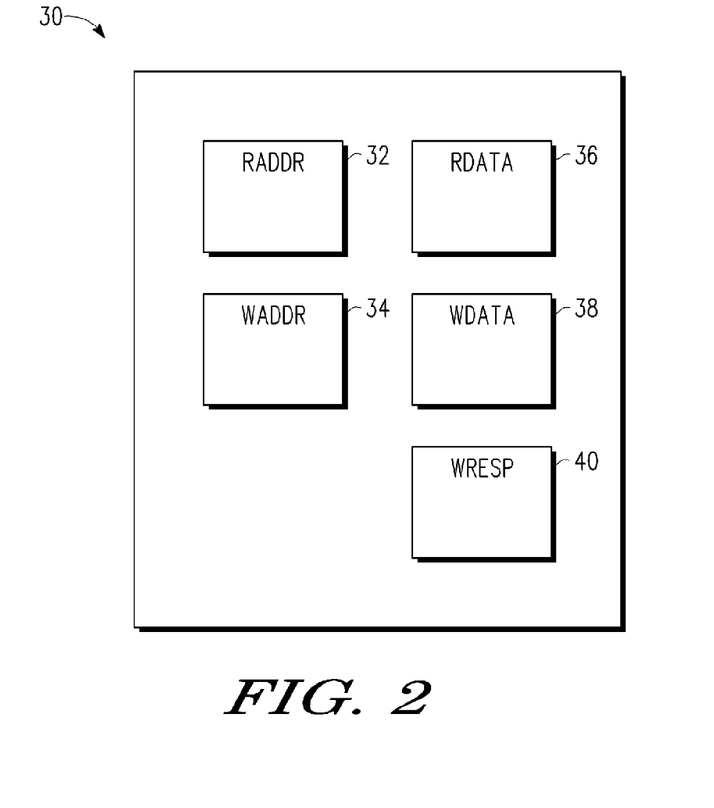
FIG. 2 shows a block diagram of an exemplary bus interconnect.

FIG. 2 shows a block diagram of bus interconnect 30. Bus interconnect 30 may include several blocks, for example, a read address block (RADDR) 32, write address block (WADDR) 34, read data block (RDATA) 36, write data block (WDATA) 38, and write response block (WRESP) 40. Read address block 32 may be used for read address channels. Write address block 34 may be used for write address channels. Read data block 36 may be used for read data channels. Write data block 36 may be used for write data channels. Write response block 40 may be used for write response channels. Although FIG. 2 shows specific number and type of components arranged in a specific manner, exemplary bus interconnect 30 may include additional or fewer and other type of components, which may be arranged differently.

Figure 3:
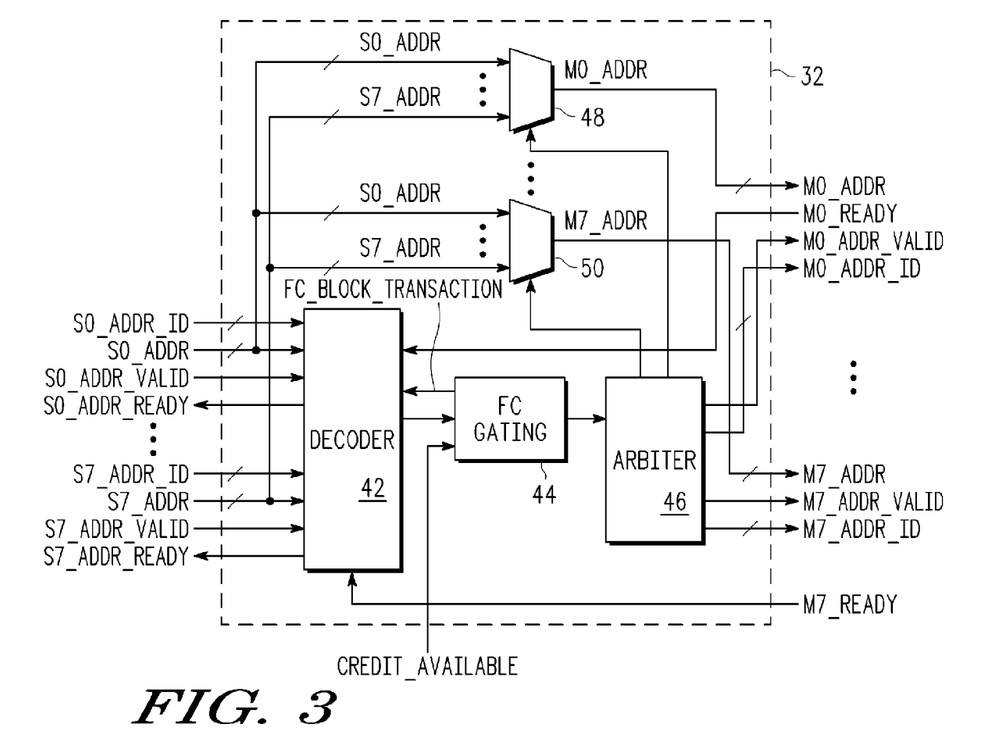
FIG. 3 shows a block diagram of an exemplary read address block incorporated as part of the exemplary bus interconnect of FIG. 2.

FIG. 3 shows a block diagram of read address block 32 incorporated as part of bus interconnect 30 of FIG. 2. Read address block 32 may exchange signals with masters (located on the left side of read address block 32) and may also exchange signals with slaves (located on the right side of read address block 32). By way of example, FIG. 3 shows exemplary interconnection between eight masters and eight slaves. Read address block 32 may include a decoder 42, a flow control (FC) gating module 44, an arbiter 46, and multiplexers 48 and 50. Decoder 42 may evaluate the address associated with each request from a master and determine the slave it is trying to communicate with. Flow control gating module 44 may determine if there is enough room in the read data buffer to allow the transaction to pass. Flow control is further explained with respect to FIG. 5. Arbiter 46 may determine which master will be granted control of a shared bus. Arbiter 46 may implement a round robin, a weighted round robin scheme, or some other scheme. Since FIG. 3 shows dedicated multiplexers for each slave, arbiter 46 needs to arbitrate between the masters that are trying to access the same slave. By way of example, master 0 may generate signals S0_ADDR_ID, S0_ADDR, and S0_ADDR_VALID and may receive signal S0_ADDR_READY. Master 7 may generate signals S7—ADDR_ID, S7_ADDR, and S7_ADDR_VALID and may receive signal S7_ADDR_READY. S0_ADDR_ID signal relates to a read transaction associated with master 0 and has a transaction ID "ADDR_ID." S0_ADDR signal relates to an address for a read transaction associated with master 0 and having an address "ADDR." S0_ADDR_VALID signal may be asserted by master 0 to indicate a valid address transaction. Bus interconnect may assert signal S0_ADDR_READY, indicating that it is ready to accept a read address transaction. As explained later, S0_ADDR_READY signal may be generated by bus interconnect 30 by performing certain flow control actions. Bus interconnect 30, acting as a master, may generate signals M0_ADDR_ID, M0_ADDR, and M0_ADDR_VALID and may receive signal M0_ADDR_READY. Although FIG. 3 shows specific number and type of components arranged in a specific manner, exemplary read address block 32 may include additional or fewer and other type of components, which may be arranged differently. In addition, although not shown, the functionality performed by flow control gating module 44, also referred to as flow control circuitry, maybe performed by sub-modules, including, for example, a resource allocation circuitry and a request gating circuitry. Indeed, the functionality corresponding to these sub-modules may be distributed further or combined.

Figure 4:
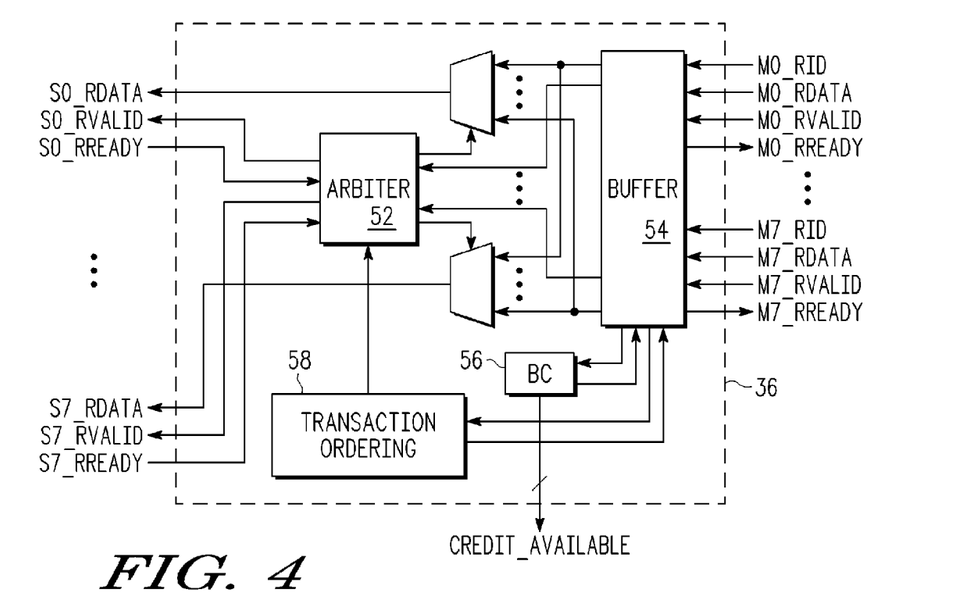
FIG. 4 shows a block diagram of an exemplary read data block incorporated as part of the exemplary bus interconnect of FIG. 2.

FIG. 4 shows a block diagram of read data block 36 incorporated as part of the bus interconnect 30 of FIG. 2. Read data block 36 may accept read transactions from all slaves and forward the read data to the designated master. By way of example, read data block 36 may include an arbiter 52, a buffer 54, a buffer controller (BC) 56, and a transaction ordering module 58. Arbiter 52 may determine which slave is granted access to a particular master. Buffer 54 may be used to store read data from various slaves in response to read data transactions. Buffer controller 56 may keep track of the buffer space. In one embodiment, each time an amount of space equivalent to a predetermined amount is freed up in buffer 54, buffer controller 56 may generate a credit_available signal. Transaction ordering module 58 may ensure that read transactions with the same transaction ID from the same master are returned in the original requested order. Transaction ordering module 58 may inform arbiter 52 of the transactions that can be forwarded to the masters. By way of example, slave 0 may generate signals M0_RID, M0_RDATA, and M0_RVALID and may receive signal M0_RREADY. Slave 7 may generate signals M7_RID, M7_RDATA, and M7_RVALID and may receive signal M7_RREADY. M0_RID signal relates to transaction ID for a read data transaction. M0_RDATA signal relates to read data signals. M0_RVALID signal indicates to bus interconnect 30 that a valid read data transaction is available. M0_RREADY signal is generated by bus interconnect 30 indicating that it is ready to accept a read transaction. Bus interconnect may assert signal M0_RREADY. A master, such as master 0 may receive signals S0_RDATA, S0_RVALID, and S0_RREADY from bus interconnect 30. S0_RDATA signal may relate to read data signal from bus interconnect 30. S0_RVALID signal may indicate to a master that a valid read data transaction is available. S0_RREADY signal may indicate to the slave that the master is ready. Although FIG. 4 shows specific number and type of components arranged in a specific manner, exemplary read data block 36 may include additional or fewer and other type of components, which may be arranged differently.

Figure 5:
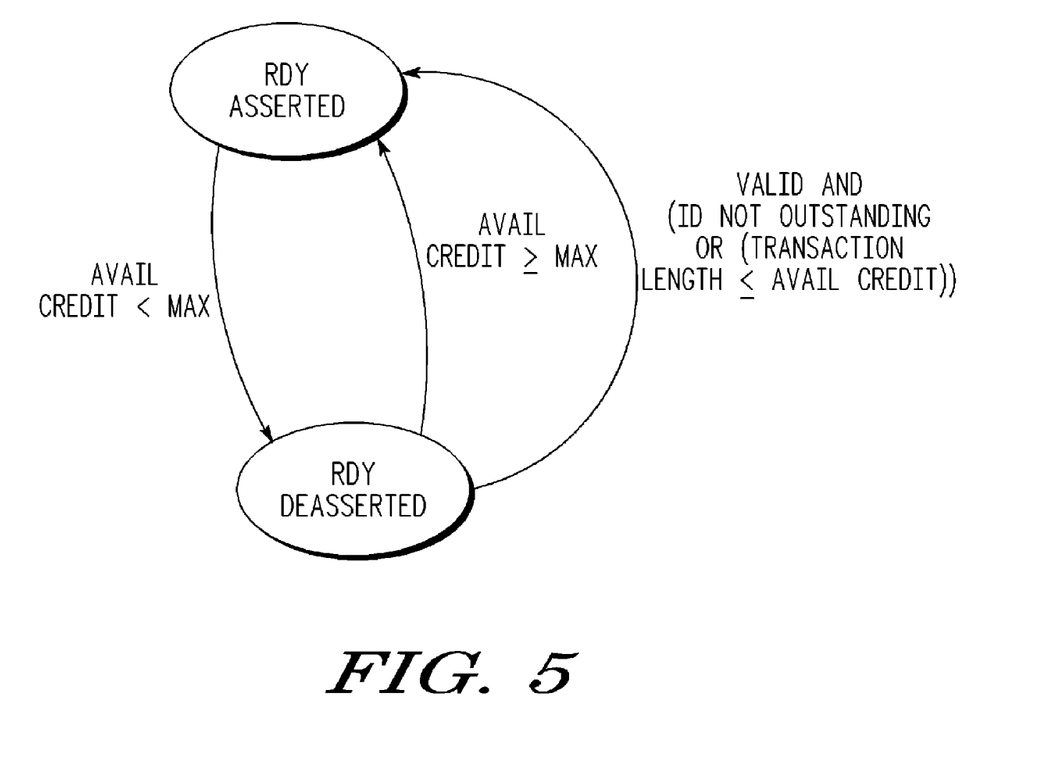
FIG. 5 shows an exemplary state diagram for a method of operating a bus interconnect.

FIG. 5 shows an exemplary state diagram for a method of operating bus interconnect 30. By way of example, state diagram shown in FIG. 5 illustrates transitions in the states of a ready (RDY) signal that bus interconnect 30 may assert to indicate to a master, for example, that it is ready to accept address from that master. Thus, in one embodiment, RDY signal may relate to S0_ADDR_READY signal shown in FIG. 3. The method of operating bus interconnect 30 may include receiving a request from a bus master to perform a bus transaction associated with a transaction ID. Bus transaction may be a read or write address transaction. In one embodiment, the transaction may be performed by bus interconnect 30 if a resource allocation parameter allocated to the master meets a first threshold. By way of example, the resource allocation parameter may correspond to available credit for that particular master. A credit may be a pre-defined multiple of bus data width. A credit may also be a number of transactions. In one embodiment, the first threshold may relate to the maximum amount of data needed to complete any transaction. Thus, by way of example, if available credit for a particular master is greater than or equal to the maximum amount of data needed for performing a transaction, then RDY signal may be asserted, in advance of a valid transaction, as indicated by state transition from RDY DEASSERTED state to RDY ASSERTED state when AVAIL CREDIT≧MAX. If, however, the available credit for the particular master is less than the maximum amount of data needed for performing the transaction, then RDY signal may be de-asserted, as indicated by state transition from RDY ASSERTED state to RDY DEASSERTED state when AVAIL CREDIT<MAX.

In one embodiment, flow control gating module 44 may keep track of available credits. By way of example, when data is read out of buffer 54, buffer controller 56 may assert CREDIT_AVAILABLE signal. In response to the receipt of the CREDIT_AVAILABLE signal, flow control gating module 44 may increment the number of credits associated with the particular master. If the read data transaction is allowed to proceed because the available number of credits is greater than the first threshold, then flow control gating module 44 may indicate to decoder 42 that it is OK to perform the transaction. In one embodiment, flow control gating module 44 may do so by de-asserting the FC_BLOCK_TRANSACTION signal (shown in FIG. 3). Flow control gating module 44 may also determine the number of credits needed to perform the transaction and decrement that total from the current number of credits available for that master. In one embodiment, for each slave interface, flow control gating module 44 may perform credit calculations including determining the number of credits freed (CREDITS_FREED) and the number of credits accepted (CREDITS_ACCEPTED) for each master. The initial value of the CREDITS_FREED flow control variable may be the initial number of credits allocated to the particular master. Flow control gating module 44 may increment CREDITS_FREED variable every time one credit of read data is forwarded to the master. CREDITS_FREED variable may roll over at 128 when 64 credits is the maximum number of initial credits. The initial value of CREDITS_ACCEPTED may be zero. Flow control gating module 44 may increment the CREDITS_ACCEPTED variable by the number of credits of the data length of every read address transaction that is accepted. CREDITS_ACCEPTED variable may roll over at 128 when 64 credits is the maximum number of initial credits. By way of example, every time an address transaction is presented to the slave interface of bus interconnect 30, the following equation has to be true in order for the transaction to be accepted:

(CREDITS_FREED−(CREDITS_ACCEPTED+[credits needed for current transaction]))mod 128<=64.

Referring again to FIG. 5, if the AVAIL CREDIT<MAX, i.e., the resource allocation parameter does not meet the first threshold, then RDY signal may switch to RDY ASSERTED state only if the transaction meets a condition of a set of at least one condition. One condition out of the set of at least one condition may relate to whether the transaction ID of the current read transaction does not have a transaction ID of any outstanding bus read transactions issued by the same master. In other words, if the current transaction is VALID and ID NOT OUTSTANDING, then RDY ASSERTED state is entered. Another condition out of the set of at least one condition may relate to whether the transaction length of the current transaction is less than the available credit. Thus, in case where the current transaction is valid and there is an outstanding bus read transaction issued by the same master that has the same transaction ID as the current transaction, RDY ASSERTED state may be entered if the transaction length for the current transaction is less than the available credit. This way, even transactions that could cause a deadlock may be allowed, as long as there is enough space in buffer 54, for example, to temporarily store out of order transactions.

Figure 6:
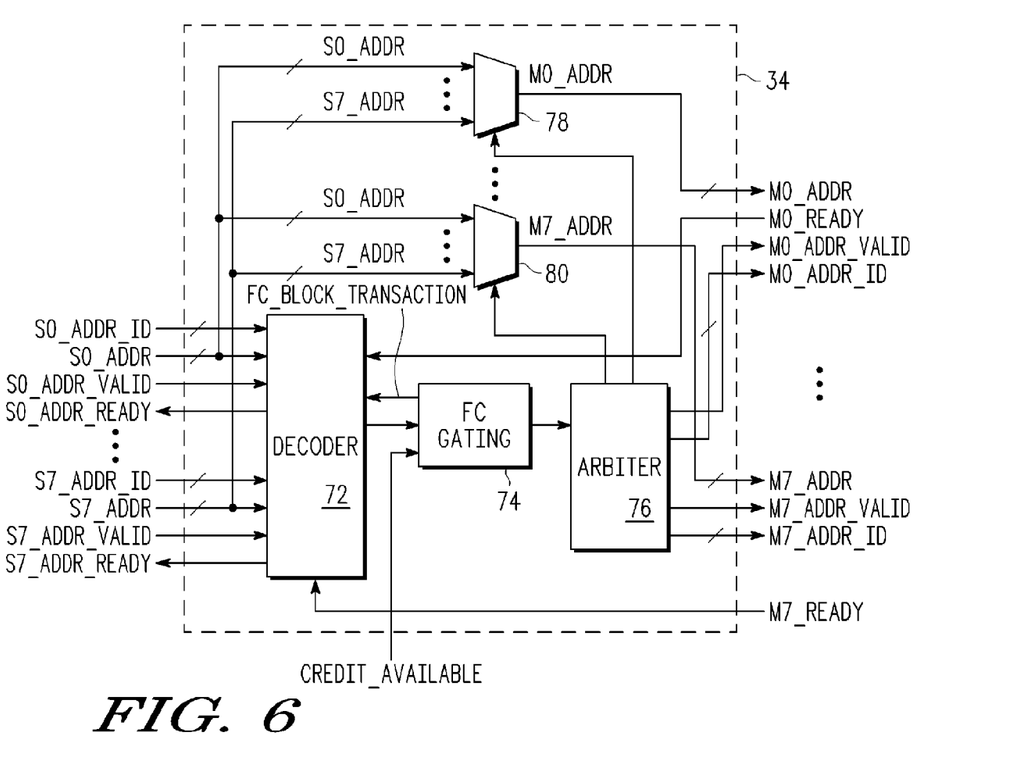
FIG. 6 shows a block diagram of an exemplary write address block incorporated as part of the exemplary bus interconnect of FIG. 2.

FIG. 6 shows a block diagram of an exemplary write address block 34 incorporated as part of bus interconnect 30 of FIG. 2. Write address block 34 may exchange signals with masters (located on the left side of write address block 34) and may also exchange signals with slaves (located on the right side of write address block 34). By way of example, FIG. 6 shows exemplary interconnection between eight masters and eight slaves. Write address block 34 may include a decoder 72, a flow control (FC) gating module 74, an arbiter 76, and multiplexers 78 and 80. Decoder 72 may evaluate the address associated with each request from a master and determine the slave it is trying to communicate with. Flow control gating module 74 may determine if there is enough room in a write response buffer to allow the transaction to pass. Flow control is further explained with respect to FIG. 8. Arbiter 76 may determine which master will be granted control of a shared bus. Arbiter 76 may implement a round robin, a weighted round robin scheme, or some other scheme. Since FIG. 6 shows dedicated multiplexers for each slave, arbiter 76 needs to arbitrate between the masters that are trying to access the same slave. By way of example, master 0 may generate signals S0_ADDR_ID, S0_ADDR, and S0_ADDR_VALID and may receive signal S0_ADDR_READY. Master 7 may generate signals S7_ADDR_ID, S7_ADDR, and S7_ADDR_VALID and may receive signal S7_ADDR_READY. S0_ADDR_ID signal relates to a write transaction associated with master 0 and has a transaction ID "ADDR_ID." S0_ADDR signal relates to an address for a write transaction associated with master 0 and having an address "ADDR." S0_ADDR_VALID signal may be asserted by master 0 to indicate a valid address transaction. Bus interconnect may assert signal S0_ADDR_READY, indicating that it is ready to accept a write address transaction. As explained later, S0_ADDR_READY signal may be generated by bus interconnect 30 by performing certain flow control actions. Bus interconnect 30, acting as a master, may generate signals M0_ADDR_ID, M0_ADDR, and M0_ADDR_VALID and may receive signal M0_ADDR_READY. Although FIG. 6 shows specific number and type of components arranged in a specific manner, exemplary write address block 34 may include additional or fewer and other type of components, which may be arranged differently.

Figure 7:
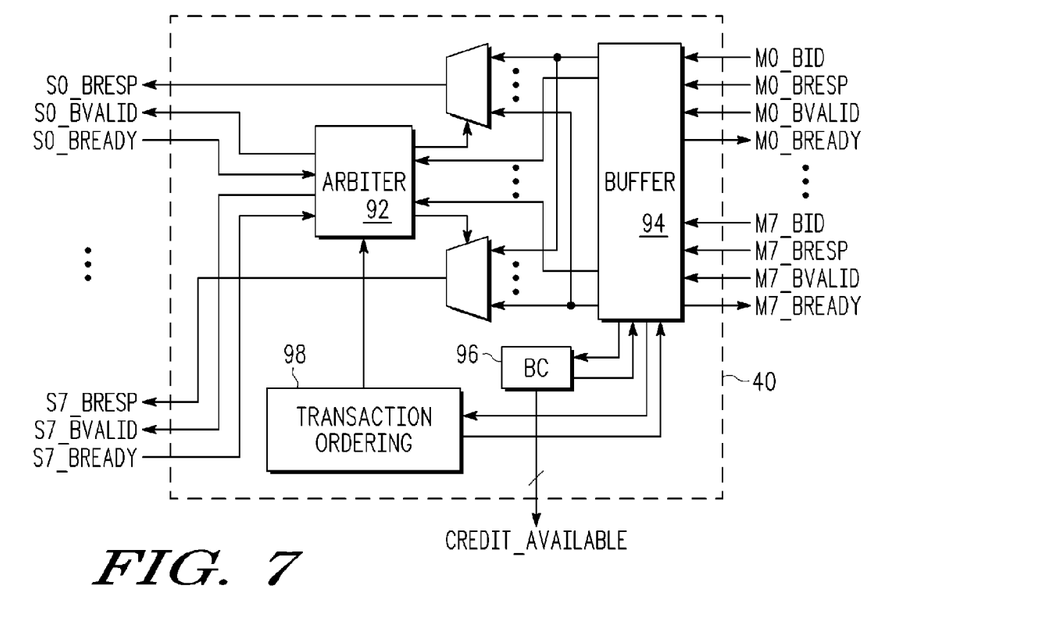
FIG. 7 shows a block diagram of an exemplary write response block incorporated as part of the exemplary bus interconnect of FIG. 2.

FIG. 7 shows a block diagram of an exemplary write response block 40 incorporated as part of bus interconnect 30 of FIG. 2. Write response block 40 may accept write responses from all slaves and forward the write response to the designated master. By way of example, write response block 40 may include an arbiter 92, a buffer 94, a buffer controller (BC) 96, and a transaction ordering module 98. Arbiter 92 may determine which slave is granted access to a particular master. Buffer 94 may be used to store write responses from various slaves in response to write data transactions. Buffer controller 96 may keep track of the buffer space. In one embodiment, each time an amount of space equivalent to a predetermined amount is freed up in buffer 94, buffer controller 96 may generate a CREDIT_AVAILABLE signal. Transaction ordering module 98 may ensure that read transactions with the same transaction ID from the same master are returned in the original requested order. Transaction ordering module 98 may inform arbiter 92 of the transactions that can be forwarded to the masters. By way of example, slave 0 may generate signals M0_BID, M0_BRESP, and M0_BVALID and may receive signal M0_BREADY. Slave 7 may generate signals M7_BID, M7_BRESP, and M7_BVALID and may receive signal M7_BREADY. M0_BID signal relates to transaction ID for a write data transaction. M0_BRESP signal provided information concerning whether the write data has been successfully accepted or not. M0_BVALID signal indicates to bus interconnect 30 that a valid write response is available. M0_BREADY signal indicates that a master is ready to accept the write response information. Bus interconnect 30 may assert signal M0_BREADY. A master, such as master 0 may receive signals S0_BRESP, S0_BVALID, and S0_BREADY from bus interconnect 30. S0_BRESP signal may relate to whether write data has been successfully accepted or not. S0_BVALID signal may indicate to a master that a valid write response is available. S0_BREADY signal may indicate to the slave that the master is ready. Although FIG. 7 shows specific number and type of components arranged in a specific manner, exemplary read data block 36 may include additional or fewer and other type of components, which may be arranged differently.

Figure 8:
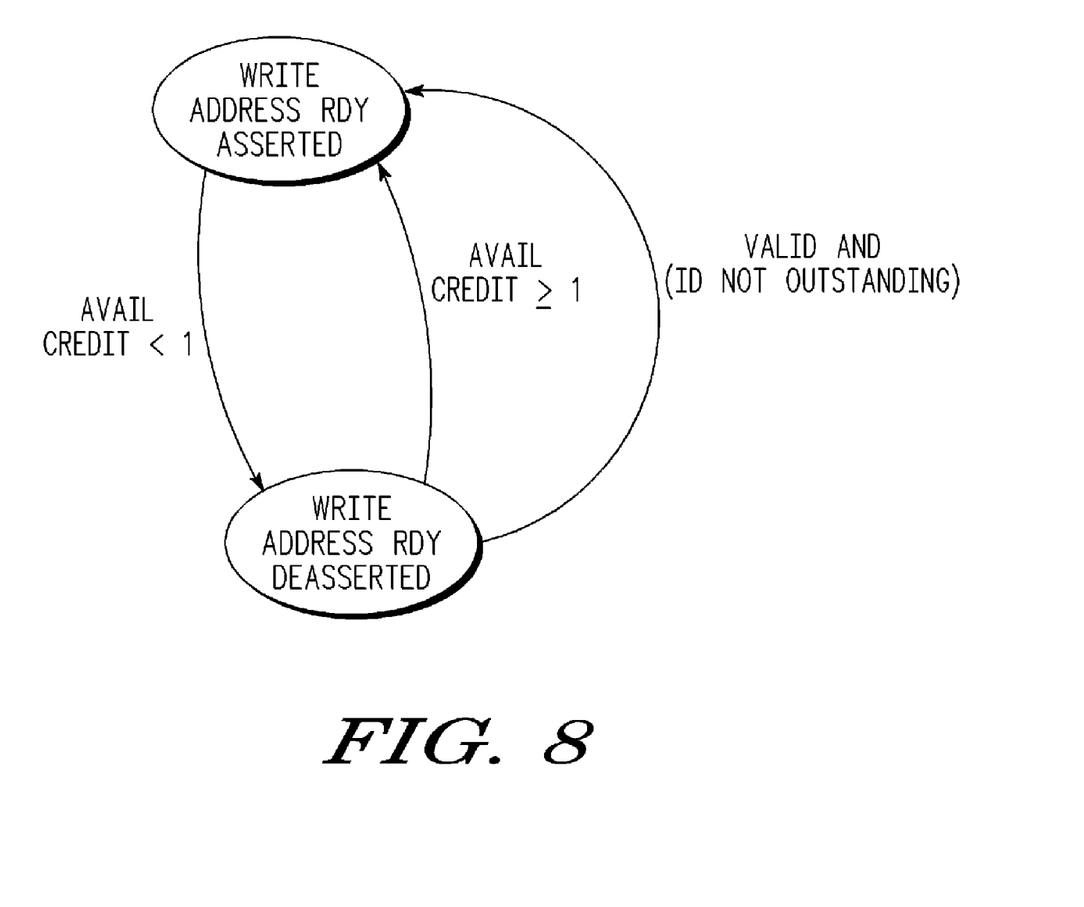
FIG. 8 shows an exemplary state diagram for a method of operating a bus interconnect.

FIG. 8 shows an exemplary state diagram for a method of operating bus interconnect 30. By way of example, state diagram shown in FIG. 8 illustrates transitions in the states of a ready (RDY) signal that bus interconnect 30 may assert to indicate to a master, for example, that it is ready to accept data or transactions from that master. Thus, in one embodiment, RDY signal may relate to M0_BREADY signal shown in FIG. 6. The method of operating bus interconnect 30 may include receiving a request from a bus master to perform a bus transaction associated with a transaction ID. Bus transaction may be a write transaction. In one embodiment, the transaction may be performed by bus interconnect 30 if a resource allocation parameter allocated to the master meets a first threshold. By way of example, the resource allocation parameter may correspond to available credits for that particular master. A credit may be a pre-defined multiple of bus data width. A credit may also be a number of write response transactions. In one embodiment, the first threshold may relate to the maximum amount of data needed to complete a write response transaction. Thus, by way of example, if available credit for the particular master is greater than or equal to 1, then RDY signal may be asserted as indicated by state transition from RDY DEASSERTED state to RDY ASSERTED state when AVAIL CREDIT≧1 If, however, the available credit for the particular master is less than 1, then RDY signal may be de-asserted, as indicated by state transition from RDY ASSERTED state to RDY DEASSERTED state when AVAIL CREDIT<1.

In one embodiment, flow control gating module 74 may keep track of available credits. By way of example, when write response is read out of buffer 94, buffer controller 96 may assert CREDIT_AVAILABLE signal. In response to the receipt of the CREDIT_AVAILABLE signal, flow control gating module 74 may increment the number of credits associated with the particular master. If the write address transaction is allowed to proceed because the available number of credits is greater than the first threshold, then flow control gating module 74 may indicate to decoder 72 that it is OK to perform the transaction. In one embodiment, flow control gating module 74 may do so by de-asserting the FC_BLOCK_ TRANSACTION signal (shown in FIG. 6). Flow control gating module 74 may also determine the number of credits needed to perform the transaction and decrement that total from the current number of credits available for that master. In one embodiment, for each slave interface, flow control gating module 74 may perform credit calculations including determining the number of credits freed (CREDITS_FREED) and the number of credits accepted (CREDITS_ACCEPTED) for each master. The initial value of the CREDITS_FREED flow control variable may be the initial number of credits allocated to the particular master. Flow control gating module 74 may increment CREDITS_FREED variable every time one credit of write response is forwarded to the master. CREDITS_FREED variable may roll over at 128 when 64 credits is the maximum number of initial credits. The initial value of CREDITS_ACCEPTED may be zero. Flow control gating module 74 may increment the CREDITS_ACCEPTED variable by the number of write responses for every write data/address transaction that is accepted. CREDITS_ACCEPTED variable may roll over at 128 when 64 credits is the maximum number of initial credits. By way of example, every time an address transaction is presented to the slave interface of bus interconnect 30, the following equation has to be true in order for the transaction to be accepted:

(CREDITS_FREED−(CREDITS_ACCEPTED+[credits needed for current transaction]))mod 128<=64.

Referring again to FIG. 8, if the AVAIL CREDIT<1, i.e., the resource allocation parameter does not meet the first threshold, then RDY signal may switch to RDY ASSERTED state only if the transaction meets a condition of a set of at least one condition. One condition out of the set of at least one condition may relate to whether the transaction ID of the current write transaction does not have a transaction ID of any outstanding write transactions issued by the same master. In other words, if the current transaction is VALID and ID NOT OUTSTANDING, then RDY ASSERTED state is entered.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory 18 may be located on a same integrated circuit as processor #1 12 and processor #2 14 or on a separate integrated circuit or located within another peripheral or slave discretely separate from other elements of system 10. Peripheral 20 and bus bridge 22 may also be located on separate integrated circuits or devices. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of operating a bus interconnect coupled to a plurality of bus masters and a plurality of bus slaves, the method comprising:

receiving a request from a bus master of the plurality of bus masters to perform a bus transaction associated with a transaction ID with a bus slave of the plurality of bus slaves, the bus transaction being a first type of bus transaction;

performing the transaction if a resource allocation parameter allocated to the bus master meets a first threshold; and if the resource allocation parameter does not meet the first threshold, performing the data transaction only if the transaction ID of the transaction is not a transaction ID of any outstanding bus transaction of the first type requested by the bus master.

2. The method of claim 1 wherein:

the resource allocation parameter is an amount of data associated with outstanding bus transactions of a first type requested by the bus master; and the first threshold is a specific amount of data.

3. The method of claim 2, wherein the first type of bus transaction is a read transaction and the resource allocation parameter is an amount of data associated with the outstanding read transactions requested by the first bus master.

4. The method of claim 2, wherein the resource allocation parameter meets the first threshold if the amount of data associated with the outstanding bus transactions is less than or equal to the specific amount of data.

5. The method of claim 1, wherein:
the first type of bus transaction is a write transaction;
the resource allocation parameter is a number of outstanding write response transactions requested by the first bus master; and
the first threshold is a specific number of outstanding write response transactions associated with the first bus master.

6. The method of claim 1, wherein:
the transaction ID of the bus transaction is a transaction ID of an outstanding bus transaction requested by the first bus master and the bus transaction's effect on resource usage would allow the resource allocation parameter to meet a second threshold.

7. The method of claim 6, wherein:
wherein the first type is a read transaction;
the resource allocation parameter is an amount of data requested by outstanding read transactions by the first bus master;
the second threshold is a second specific amount of data; and
wherein the amount of data requested by the read transaction in addition to the amount of data requested by outstanding read transactions by the first master is less than or equal to the second specific amount of data.

8. The method of claim 7, wherein:
if the data resource allocation parameter allocated to the bus master meets the first threshold, providing a ready signal to the first bus master in an asserted state; and
if the data resource allocation parameter allocated to the bus master does not meet the first threshold, providing the ready signal to the first bus master in a non asserted state and placing the ready signal in an asserted state in response to the receiving the request and a determination that a condition of the first set of at least one condition is met.

9. A bus interconnect comprising:
a first plurality of ports, each of the first plurality for coupling to a bus master;
a second plurality of ports, each port of the second plurality of ports for coupling to a bus slave;
arbitration circuitry for directing requests from a bus master coupled to a port of the first plurality of ports to a bus slave coupled to a port of the second plurality of ports;
buffer circuitry for buffering information from a bus slave coupled to a port of the second plurality to a bus master coupled to a port of the first plurality of ports; and
flow control circuitry, the flow control circuitry including:
resource allocation circuitry for determining for each bus master coupled to an input port of the first plurality of ports, whether a resource allocation parameter for the bus master meets a threshold for the bus master;
request gating circuitry, the request gating circuitry blocking a request from a bus master coupled to a port of the first plurality of ports if a resource allocation parameter for the bus master does not meet a threshold as determined by the resource allocation circuitry, wherein if the resource allocation parameter is determined not to meet a threshold as determined by the resource allocation circuitry, the request gating circuitry allowing the request only if a transaction ID of the request by the bus master is not a transaction ID of any outstanding bus transactions requested by the bus master of a same type of transaction requested by the request.

10. The bus interconnect of claim 9, wherein:
the resource allocation parameter is an amount of data associated with outstanding bus transactions of the same type by the bus master making a request, the threshold is a specific amount of data for the bus master.

11. The bus interconnect of claim 10, wherein the same type of bus transaction is a read transaction and the resource allocation parameter is an amount of data associated with outstanding read transactions requested by a bus master.

12. The bus interconnect of claim 9, wherein:
the same type of bus transaction is a write transaction,
the resource allocation parameter is a number of outstanding write response transactions requested by a bus master making the request; and
the first threshold is a specific number of outstanding write response transactions associated with the bus master making the request.

13. The bus interconnect of claim 9, wherein:
the transaction ID of a bus transaction of a request is a transaction ID of an outstanding bus transaction of the same type of a bus master making the request and the bus transaction's effect on resource usage would allow the resource allocation parameter of the bus master to meet a second threshold of the bus master.

14. The bus interconnect of claim 13, wherein:
the same type is a read transaction;
the resource allocation parameter is an amount of data requested by outstanding read transactions by a bus master making a request;
the second threshold is a second specific amount of data for the bus master; and
wherein the amount of data requested by the read transaction in addition to the amount of data requested by outstanding read transactions by a bus master making the request is less than or equal to the second specific amount of data.

15. The bus interconnect of claim 9, wherein:
each port of the first plurality of ports includes an output wherein the output is provided in an asserted state to a bus master coupled to the port if the resource allocation parameter for that bus master is determined to meet a threshold for the bus master as determined by the resource allocation circuitry; and
an output of a port of the first plurality of ports is provided in a non asserted state to a bus master coupled to the port if the resource allocation parameter is determined not to meet a threshold for the bus master as determined by the resource allocation circuitry, and if the resource allocation parameter is determined not to meet the threshold for the bus master as determined by the resource allocation circuitry, the port is placed in an asserted state in response to receiving a request from the bus master and a determination that a transaction ID of the request by the bus master is not a transaction ID of any outstanding bus transactions requested by the bus master of a same type of transaction requested by the request.

16. The bus interconnect of claim 9 further comprising:
a first bus master coupled to a first port of the first plurality of ports;
a second bus master coupled to a second port of the first plurality of ports;
a first bus slave coupled to a third port of the second plurality of ports; and
a second bus slave coupled to a fourth port of the second plurality of ports.

17. The bus interconnect of claim 9, wherein the bus interconnect is compliant with a standard based on the Advance eXtensible Interconnect (AXI) standard.

18. A method of operating a bus interconnect coupled to a plurality of bus masters and a plurality of bus slaves, the method comprising:

receiving a request from a bus master of the plurality of bus masters to perform a bus transaction associated with a transaction ID with a bus slave of the plurality of bus slaves, the bus transaction being a first type of bus transaction;

determining if a resource allocation parameter allocated to the bus master meets a first threshold;

performing the transaction if the resource allocation parameter allocated to the bus master meets a first threshold; and if the resource allocation parameter is determined not meet the first threshold, performing the bus transaction only if:
1) the transaction ID of the transaction is not a transaction ID of any outstanding bus transaction of the first type requested by the first bus master; or
2) the transaction ID of the bus transaction is a transaction ID of an outstanding bus transaction requested by the first bus master and the bus transaction's effect on resource usage would allow the resource allocation parameter to meet a second threshold.

19. The method of claim 18, wherein the performing the transaction includes performing the bus transaction as per a standard based on the Advance eXtensible Interconnect (AXI) standard.

20. The method of claim 18, wherein:

if the data resource allocation parameter allocated to the bus master meets the first threshold, providing a ready signal to the first bus master in an asserted state; and if the data resource allocation parameter allocated to the bus master does not meet the first threshold, providing the ready signal to the first bus master in a non asserted state and placing the ready signal in an asserted state in response to the receiving the request and one of:
1) the transaction ID of the transaction is not a transaction ID of any outstanding bus transaction of the first type requested by the first bus master; or
2) the transaction ID of the bus transaction is a transaction ID of an outstanding bus transaction requested by the first bus master and the bus transaction's effect on resource usage would allow the resource allocation parameter to meet a second threshold.

* * * * *